Aug. 28, 1923.
G. H. LOBER
1,466,404
AUTOMOBILE RADIATOR ASSEMBLY RACK
Original Filed April 29, 1921
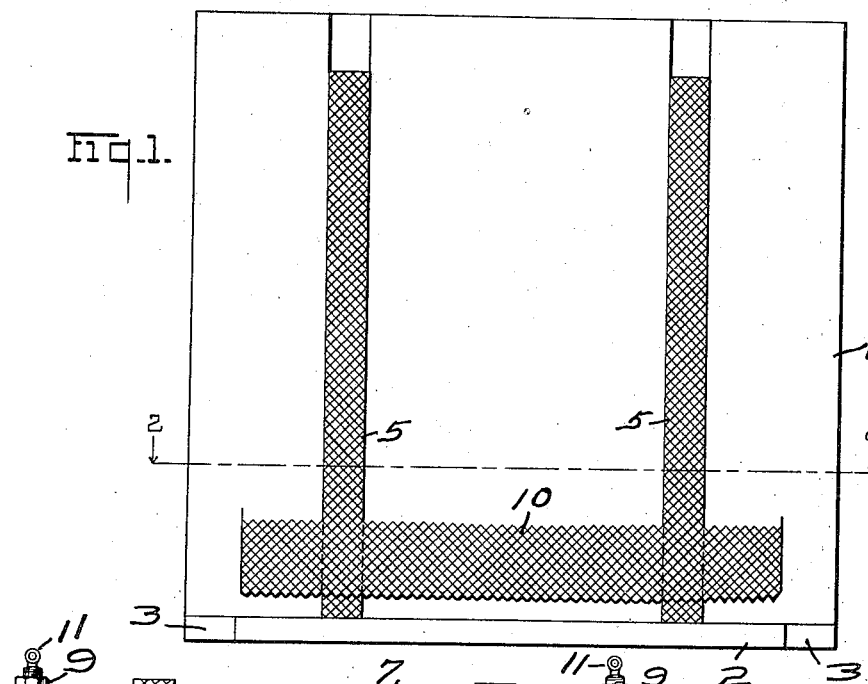
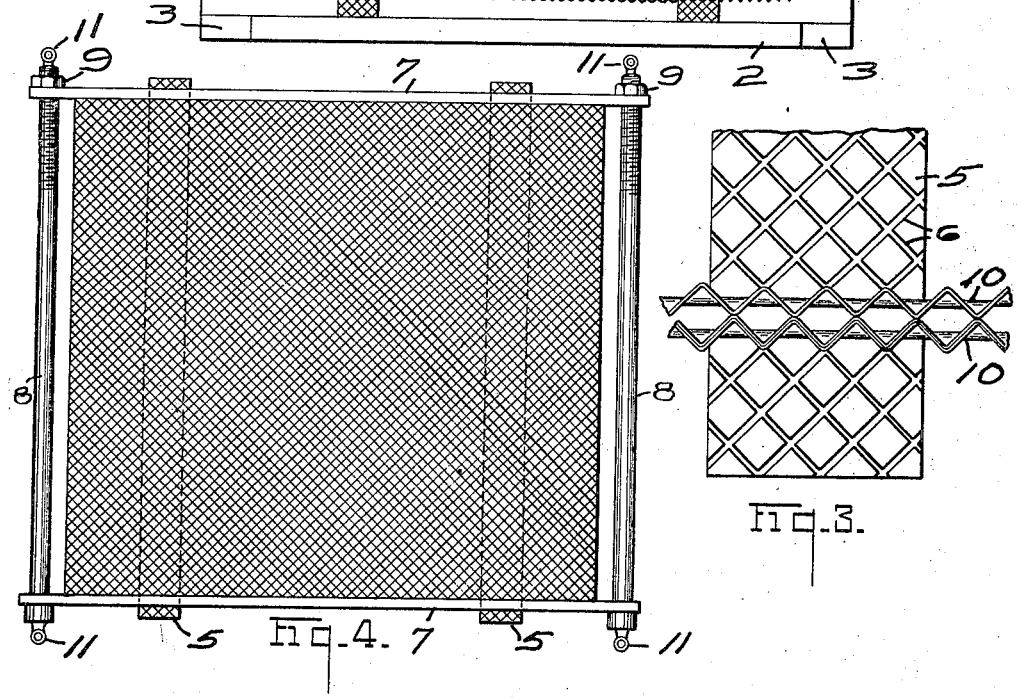
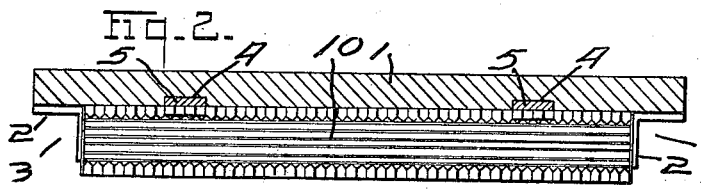
INVENTOR
George H. Lober
by
Owen Owen Campton Patented Aug. 28, 1923.

1,466,404

UNITED STATES PATENT OFFICE.

GEORGE H. LOBER, OF TOLEDO, OHIO, ASSIGNOR TO THE LOBER RADIATOR & MANUFACTURING COMPANY, OF TOLEDO, OHIO, A CORPORATION OF OHIO.

AUTOMOBILE RADIATOR ASSEMBLY RACK.

Application filed April 29, 1921, Serial No. 465,578. Renewed July 21, 1923.

*To all whom it may concern:*

Be it known that I, GEORGE H. LOBER, a citizen of the United States, and a resident of Toledo, in the county of Lucas and State of Ohio, have made an Invention Appertaining to an Automobile Radiator Assembly Rack; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an exceedingly convenient and efficient means for assembling the strips that form the water and air passage-ways of an automobile radiator. The invention provides a means whereby the strips may be easily piled and held in their definite contiguous relation to each other, and in such a position that they may be easily clamped and held until the edges of the strips are sealed by dipping them in solder.

The invention may be contained in structures of different forms. To illustrate a practical application of the invention I have selected one of the structures containing the invention as an example and shall describe it hereinafter. The structure selected is illustrated in the accompanying drawings.

Figure 1 of the drawings illustrates a supporting board. Fig. 2 illustrates a sectional view taken on the line 2—2 indicated in Fig. 1. Fig. 3 is a full size view of a part of the assembling bars and three of the strips secured in position. Fig. 4 illustrates the strips of the radiator assembled and in position for one side thereof to be dipped.

1 is a back or base board that may be tilted rearwardly at a slight angle for convenience in the piling of the strips or the assembling operation. It may be provided with a step or flange or strip 2 secured to the lower edge thereof. The strip 2 is provided with recesses 3 that may be formed by cutting out corners of the strip, which permits easy connection with clamping rods, as hereinafter described.

The base board 1 is provided with channels 4 in which are located assembling bars 5 disposed parallel to each other and at a distance apart which is less than the length of the strips to be assembled. The bars 5 are provided with channels that conform to the shape of the edges of the radiator, as for example, if the radiator has a honey-comb appearance, and the openings of the honey-comb are square, the edges will be bent so as to produce the square openings. Similarly, if the openings are triangular, or circular, or hexagonal, or whatever their shape may be, the edges of the strips are bent accordingly. The channels of the assembling bars 5 are cut in the bars so as to conform to the shape in which the edges of the strips are bent. The channels 6 of the bars 5 are cut to a depth sufficiently great to hold each of the strips in the position in which it is placed, and the portions of the bars 5 in which the channels are formed protrude from the board 1 and so that the bottoms of the channels are preferably flush with the surface of the board 1.

In assembling the strips they are placed in pairs against the board 1, and so that their edges enter the channels 6, or pairs of strips may be alternated with single strips if single strips are to be used for spacing purposes, that is, for spacing between the water passage-ways formed by the pairs of strips. The strips will thus be held in position and so as to form the honey-comb appearance of the radiator. If the openings of the honey-comb are square in form, the corners of the openings formed by the edges of the strips may be placed in juxtaposition, and they will thus be held by the assembly bars 5 until the strips are dipped.

It is desirable to clamp the strips in the position in which they are assembled and held by the bars 5 preparatory to the dipping, whereby the pile or assembled strips may be more readily and roughly handled. A pair of bars 7 may be placed on the top and bottom of the strips as assembled and clamped together by means of the threaded rods 8 and the nuts 9. In order that the lower bar 7 may be readily placed in position, the lowermost of the strips 10 is placed slightly above the bottom edge of the board 1, that is, slightly above the strip 2. The rods 8 are provided with eyes 11 whereby the clamped assembled strips may be easily picked up with tongs or hooks, or supported or placed on pins preparatory to or during the soldering operation. The lower ends of the rods 8 will be located in or in line with the recesses 3 of the strip 2. The recesses 3 form convenient space for manipulating the rods, and yet it permits the lowermost of the strips 10 to be placed quite close to the lower edge of the board 1.

In the soldering operation the clamped assembled strips are lifted from the board 1, and the bars 5 will be removed from the channels 4 since they will be quite tightly held in position by the clamping of the strips. The bars 5 will hold the strips in position until they are dipped and sealed by the solder. The bars 5 may then be pulled from the strips, the opposite side of the assembled strips being sealed in position, and then the other side of the assembled strips may be dipped.

I claim:

1. In an assembling device for automobile radiators formed of a plurality of sheet metal strips having corrugated edge portions, a board having a pair of channels, a pair of removable strips located in the channels and having edge portions protruding from the board, the edge portion of the strips being provided with a plurality of channels of corrugated shape and conforming to the corrugations of the edge portions of the sheet metal strips and intercommunicating at the apices of the corrugations of the channels to place the strips into contact at the said points and the points intermediate the said strips.

2. In an assembling device for automobile radiators formed of a plurality of sheet metal strips having corrugated edge portions, a board having a pair of channels, a pair of removable strips located in the channels and having edge portions protruding from the board, the edge portions of the strips being provided with a plurality of channels of corrugated shape and conforming to the corrugations of the edge portions of the sheet metal strips and intercommunicating at the apices of the corrugations of the channels to place the strips into contact at the said points and the points intermediate the said strips, the board having a flange for setting a clamping member located at the lower end of the strips having the channels for setting a clamping member, and means for clamping the assembled strips in position.

In testimony whereof, I have hereunto signed my name to this specification.

GEORGE H. LOBER.